June 27, 1944.   C. SCHIFFL   2,352,346
ELECTROPLATED BEARING ELEMENT
Filed Aug. 6, 1941
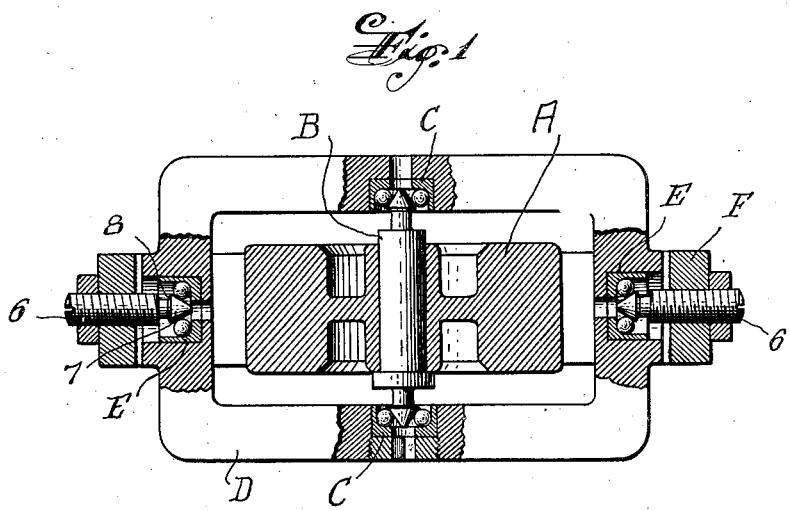
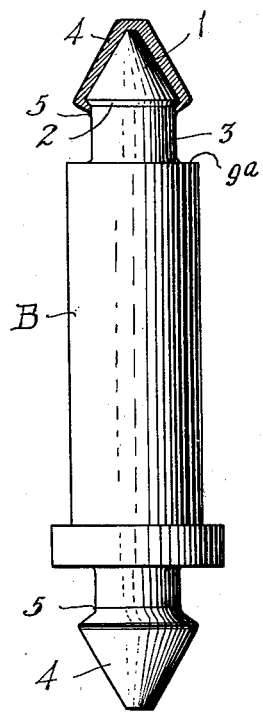
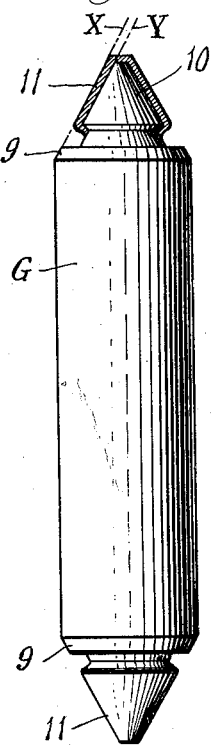
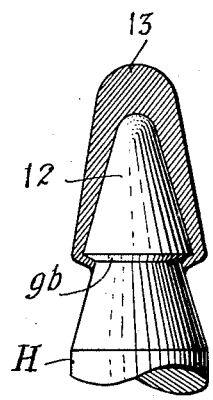
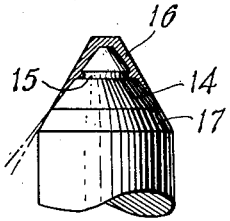
INVENTOR
Charles Schiffl,
BY
Harry B. Cook,
ATTORNEY Patented June 27, 1944

2,352,346

UNITED STATES PATENT OFFICE 2,352,346

ELECTROPLATED BEARING ELEMENT

Charles Schiffl, Montclair, N. J.

Application August 6, 1941, Serial No. 405,642

5 Claims. (Cl. 308—235)

This invention relates in general to bearing elements, for example shafts, having contact or bearing surfaces consisting of chromium electrodeposited upon the bearing elements, and more particularly the invention contemplates such bearing elements for the rotors and gimbal rings of gyroscopes.

It has been proposed to electroplate chromium upon the bearing surfaces of bearing elements, but satisfactory results have not been attained due to the tendency of the chromium coating to break away or become detached from the bearing element.

It is necessary that the bearing surfaces of a bearing element shall be highly resistant to wear that results from frictional contact between cooperating bearing elements. For this reason, among others, it has been customary to form the rotor shafts of gyroscopes of steel. However, this has led to difficulties in that it is desirable that the supporting parts of the gyroscope be formed of extremely light-weight materials, for example aluminum or magnesium, and these light-weight materials have a different and greater coefficient of expansion than steel, so that it has been necessary to incorporate special means or structure in the bearings to compensate for the differences in expansion and contraction of the steel shaft and the supporting parts of the gyroscope. This special means or structure, while more or less satisfactory in operation, comprises additional parts that require time and care for replacement, repair and adjustment.

With my invention, the rotor shaft of a gyroscope can be made of material that has any desired coefficient of expansion, for example substantially the same coefficient as materials that support the shaft, so that the above-mentioned special compensating means may be eliminated along with all errors or discrepancies in the operation of the gyroscope that are due to the effects of temperature changes on the bearings. My invention also contemplates the elimination or reduction of rust or corrosion at the bearing surfaces of the bearing elements, and my invention also makes it possible to utilize non-magnetic material for the bearing elements, whereby a non-magnetic instrument can be produced.

A prime object of the invention is to provide a novel and improved bearing element of the general character described and a method of making it, wherein the electroplated coating for the bearing surface of the element shall be secured to the bearing element in such a manner as to prevent said coating from breaking away or becoming detached from the element.

Another object is to provide a bearing element of this character which shall embody a novel and improved construction whereby the thickness of the electroplated bearing surface can be easily and quickly determined.

Other objects, advantages and results of the invention will appear from the following description when read in conjunction with the accompanying drawing in which Figure 1 is a schematic fragmentary vertical sectional view through a portion of a gyroscope that includes bearing elements embodying my invention.

Figure 2 is an enlarged side elevational view of the shaft for the rotor of the gyroscope with the electroplated bearing surface at one end shown in section.

Figure 3 is a similar view showing a modification of the invention.

Figure 4 is a view similar to Figure 3 showing the bearing portion of another bearing element embodying the invention, and Figure 5 is a like view of a further modification of the invention.

Specifically describing the illustrated embodiment of the invention, the reference character A designates the rotor of a gyroscope which is mounted on a shaft B that is journaled in bearings C in a frame or gimbal ring D which is in turn journaled on bearings E in a gimbal ring F.

The shaft B may be formed of any suitable metal or alloy, but preferably is composed of hard drawn brass. The shaft has bearing portions at its ends each of which includes a frusto-conical surface 1 whose smaller diameter is at the extremity of the shaft, and an inclined circumferential shoulder 2 at the inner end of the frusto-conical portion 1 that extends inwardly toward the axis of the surface 1 to a reduced neck 3. The surface 1 and the shoulder 2 are thereby angularly related to each other.

The shaft may be formed as so far described in any suitable manner, and the bearing portions 1 and 2 are electroplated, preferably with chromium, so as to form a coating 4 that covers the frusto-conical surface 1, the outer extremity of the bearing portion, the shoulder 2, and extends along the neck 3 as at 5. The portion 5 of the coating is formed of less thickness than the portions on the frusto-conical surface 1 and on the shoulder 2. The coating 4 may be formed of any desired thickness, for example from a flash to .108″. After the electroplating operation, the outer surfaces of the coating preferably will be ground or lapped in any suitable known manner to remove the outer portions of the coating and produce a highly polished surface.

I have found that the electroplated coatings on bearing elements formed in this manner are highly resistant to frictional wear and will withstand long use without breaking or becoming loosened or detached from the bearing portions of the elements. The shoulder 2 provides a secure bond or interlock between the electroplated coating and the bearing portion of the shaft, and the thin portions 5 of the coating firmly adhere to the shaft to provide a further bond between the shaft and the coating. This is especially important when it is remembered that according to the teachings of the prior art, relatively thick electroplated coatings easily break or become detached from the surface to which they are applied.

The invention may also be embodied in the pivot screws 6 of the bearings E by forming said screws with bearing portions having frusto-conical surfaces 7 and shoulders 8 corresponding to the frusto-conical portions 1 and shoulders 2 hereinbefore described, and then electroplating said bearing portions in the same manner as above described in connection with the bearing portions of the shaft B.

A modification of the invention is shown in Figure 3 where the shaft is constructed to permit easy and accurate measurement of the thickness of the coating. This shaft G is in general the same as the shaft A and has a frusto-conical bearing shoulder 9 located inwardly of and coaxial with the frusto-conical surface 10 of the bearing portion of the shaft. The surface of the shoulder 9 is parallel to the surface of the bearing portion 10 and the base radius of the shoulder 9 is greater than the base radius of said bearing portion in an amount equal to the desired thickness of the electroplated coating 11. After the electroplating operation has been completed, the electroplated coating 11 will be ground or lapped until the surface thereof is flush with the surface of the shoulder 9 as indicated by the line X in Figure 3, whereupon it will be known that the thickness of the coating is equal to the difference between the base radii of the frusto-conical surfaces 9 and 10, or the distance between the lines X and Y, which are extensions of the surfaces 9 and 10 respectively.

Preferably, the shaft A has a shoulder 9a of a larger diameter than the bearing portion and located inwardly thereof, so that with a knowledge of the angle of the sides of the frusto-conical bearing portion and with a micrometer having two portions, one to contact the outer surface of the electro-deposited layer 4 and the other to abut said shoulder, the thickness of the layer can be determined.

A further modification of the invention is shown in Figure 4 where the smaller extremity of the frusto-conical bearing portion 12 of the bearing element H is rounded to cooperate, for example, with a jewel bearing, and the layer of chromium or other electrodeposited metal is deposited so that it will be thickest at said rounded end of the bearing portion as indicated at 13 and gradually decrease in thickness toward the shoulder 9b which corresponds to the shoulder 2 of Figure 2. The bearing layer of chromium is of the required thickness where the friction and wear occurs incident to contact with the jewel and is thinner where no friction is encountered. The thinner portions of the layer require less time for electrodeposition and less metal, so that both a saving in cost of production and firmer adherence of the layer to the bearing-portion 12 at the thinner portion of the layer, are attained.

Figure 5 shows another modification where the frusto-conical bearing portion 14 of the bearing element I has a circumferential groove 15 in its surface into which the electrodeposited layer 16 extends. The groove 15 provides a surface corresponding to the shoulder 2, that meets the surface of the bearing portion 14 at an angle and extends inwardly toward the axis of the bearing element, to provide a bond between said layer 16 and said bearing portion.

Preferably the bearing element has a shoulder or surface 17 which is a frustum of cone that is coaxial with and merges into the portion 14. The length of the shoulder is known and the apex angle thereof is known and smaller than that of the portion 14 to facilitate determination of the thickness of the electrodeposited layer at a given point in the length of said bearing surface by gauging of the external diameter of said layer at said point and calculation based on said angles and the length of said shoulder 17.

It will also be understood that the balls and races of the bearings C and E may be formed of suitable metals and electroplated; for example the balls and races may be formed of brass and electroplated with chromium.

Having thus described my invention, what I claim is:

1. A bearing element having a bearing surface and a second surface extending inwardly from said bearing surface toward the axis of the element and meeting said bearing surface at an angle, and an electrodeposited coating extending continuously on both of said surfaces.

2. A bearing element having a frusto-conical bearing surface, and a second surface meeting said frusto-conical surface at an angle and extending circumferentially of the element and inwardly toward the axis thereof, and a continuous electrodeposited coating on both of said surfaces.

3. A bearing element having a frusto-conical bearing surface whose smaller diameter is at the extremity of the element, and a second surface meeting said frusto-conical surface at the larger end of the latter at an angle and extending circumferentially of the shaft and inwardly toward the axis thereof, and a continuous electrodeposited layer of metal on and covering said frusto-conical surface, the extremity of the element, and said second surface.

4. The bearing element set forth in claim 3 wherein said coating also extends from said second surface along said element inwardly of said bearing surface.

5. The bearing element set forth in claim 3 wherein the extremity of the frusto-conical bearing surface is rounded and the electrodeposited layer of metal gradually decreases in thickness from said extremity of the element toward said second surface.

CHARLES SCHIFFL.